United States Patent
Nagai et al.

(10) Patent No.: US 8,144,569 B2
(45) Date of Patent: Mar. 27, 2012

(54) MULTI-LAYER OPTICAL DISC, AND RECORDING METHOD AND APPARATUS FOR MULTI-LAYER OPTICAL DISC

(75) Inventors: Yutaka Nagai, Yokohama (JP); Koichiro Nishimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/983,569

(22) Filed: Jan. 3, 2011

(65) Prior Publication Data

US 2011/0096656 A1 Apr. 28, 2011

Related U.S. Application Data

(63) Continuation of application No. 11/862,231, filed on Sep. 27, 2007, now Pat. No. 7,869,317.

(30) Foreign Application Priority Data

Oct. 27, 2006 (JP) ................. 2006-291968

(51) Int. Cl.
*G11B 3/70* (2006.01)
*G11B 5/84* (2006.01)
*G11B 7/26* (2006.01)
*G11B 5/00* (2006.01)
*G11B 7/12* (2006.01)
*G11B 7/00* (2006.01)

(52) U.S. Cl. ............ 369/283; 369/47.5; 369/47.51; 369/47.53; 369/116; 369/94

(58) Field of Classification Search ........ 369/47.51, 369/47.53, 94, 283, 47.5, 116
See application file for complete search history.

(56) References Cited

U.S. PATENT DOCUMENTS

| | | |
|---|---|---|
| 2004/0076094 A1 | 4/2004 | Toshiaki et al. |
| 2005/0117480 A1 | 6/2005 | Yun |
| 2007/0041308 A1 | 2/2007 | Muramatsu et al. |

FOREIGN PATENT DOCUMENTS

| | | |
|---|---|---|
| JP | 2000-311346 | 11/2000 |
| JP | 2003-22532 | 1/2003 |

*Primary Examiner* — Joseph Haley
*Assistant Examiner* — Nicholas Lee
(74) *Attorney, Agent, or Firm* — Antonelli, Terry, Stout & Kraus, LLP.

(57) ABSTRACT

Each layer includes a data recording area and a test writing area divided into a plurality of small areas, wherein the small areas of the test writing area are recorded in advance so that other each layer can make a combination of recorded and unrecorded states with respect to the small area, where OPC is carried out, in a layer where OPC is carried out. Moreover, OPC is carried out to each small area, where a combination of recorded/unrecorded states of other each layer differs from each other, to thereby calculate, as the optimum power, an average value of the result of each OPC or a central value of the dispersion thereof.

6 Claims, 5 Drawing Sheets

MULTI-LAYER OPTICAL DISC, AND RECORDING METHOD AND APPARATUS FOR MULTI-LAYER OPTICAL DISC

CROSS REFERENCE TO RELATED APPLICATION

This application is a continuation of U.S. application Ser. No. 11/862,231, filed Sep. 27, 2007, now U.S. Pat. No. 7,869,317, the contents of which are incorporated herein by reference.

INCORPORATION BY REFERENCE

The present application claims priority from Japanese application JP2006-291968 filed on Oct. 27, 2006, the content of which is hereby incorporated by reference into this application.

BACKGROUND OF THE INVENTION

The present invention relates to multi-layer optical discs, and in particular relate's to a method of calculating an optimum value of a laser power for recording into a multi-layer optical disc.

In the case where information is recorded into an optical disc having an once-writable or rewritable multi-layer structure, a method of JP-A-2000-311346 is known as the method of adjusting the laser output during recording to an optimum recording power value with respect to a data area of a layer, to which information is written (Optimum Power Control, hereinafter, referred to as "OPC").

SUMMARY OF THE INVENTION

When recording information by irradiating a multi-layer optical disc with a laser beam, a difference will arise in the transmissivity of an upper layer depending on whether the upper layer near an incident plane of the laser beam is recorded or unrecorded, and therefore even if a laser beam with the same power is emitted, the power of the laser beam supplied to a lower layer away from the incident plane will vary. Moreover, the optimum recording power may fluctuate due to an effect of a cross talk from the information recorded in other recording layer.

In JP-A-2000-311346, OPC in a "trial writing area of a lower layer" is carried out with a laser beam passing through a "test writing area of an upper layer" where a random pattern is recorded. However, the "optimum recording power value" calculated in this manner is not a suitable one when recording into a "data area of the lower layer" with a laser beam passing through an unrecorded "data area of the upper layer".

In recent years, an optical disc that can record a data into any layer of a multi-layer optical disc has been introduced. In the data area of an upper layer of such optical disc, an area where a data is recorded and an area where a data is not recorded may coexist. For this reason, when recording a data into a lower layer, there are a case where a data is recorded into a "data area of the lower layer" with a laser beam passing through an unrecorded "data area of the upper layer" and a case where the data is recorded into a "data area of the lower layer" with a laser beam passing through a recorded "data area of the upper layer". However, since the "optimum recording power value" calculated in the OPC of JPA-2000-311346 is the optimum value for either one of the above-described cases, the "optimum recording power value" is not effective for the other case, thus causing a problem of not contributing to an improvement in the recording quality of data in either one of the cases.

The above-described problem is solved by the inventions described in the claims.

According to the present invention, even if recording is carried out randomly to a multi-layer disc and the recorded portion and unrecorded portion in each layer are randomly distributed and the transmissivity becomes random, it is possible to write with a favorable power and improve the recording quality of the data.

Other objects, features and advantages of the invention will become apparent from the following description of the embodiments of the invention taken in conjunction with the accompanying drawings.

DETAILED DESCRIPTION OF THE EMBODIMENTS

Figure 1:
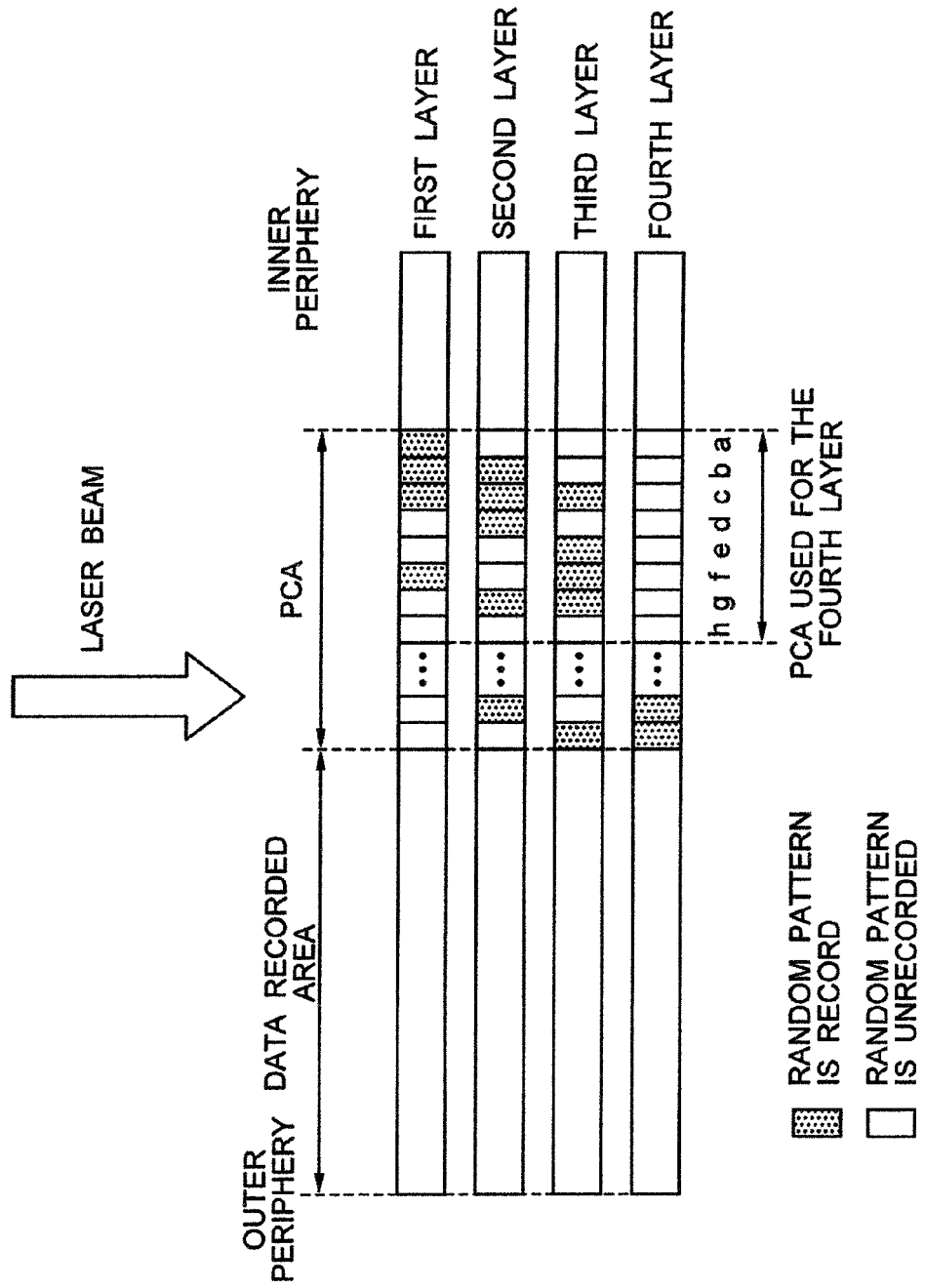
FIG. 1 is a view showing a first embodiment that is a multi-layer optical disc of the present invention.

A multi-layer optical disc that is a first embodiment of the present invention is described with a recording type optical disc having a four layer structure being as an example, using FIG. 1.

FIG. 1 is a cross sectional view of a multi-layer optical disc, which is recordable or reproducible from one side, where the right side is an inner peripheral side of the optical disc and the left side is an outer peripheral side of the optical disc. A laser beam for recording into or reproducing from each layer of this optical disc is incident from the above. Hereinafter, these layers are referred to as a first layer, a second layer, a third layer, and a fourth layer in this order from the one nearest to the incident plane of the laser beam.

Each layer has, as the recordable areas, a test writing area PCA (Power Calibration Area) where OPC is carried out to calculate an optimum power, and a data recording area to which a user data is written. Namely, in FIG. 1, there are four PCAs: the PCA for the first layer; the PCA for the second layer; the PCA for the third layer; and the PCA for the fourth layer. The PCA of each layer is segmented into a plurality of small areas, such as a, b, c, d, e, f, g, h, sequentially in the radial direction, in this order from the inner periphery. Note that although in this embodiment the description will be made assuming the PCA of each layer is provided spirally, the PCA may be provided concentrically.

As shown in FIG. 1, all the areas a to h of the PCA for the fourth layer are unrecorded, while a random pattern is recorded in the PCA used for the first layer, the PCA used for the second layer, and the PCA used for the third layer as shown in Table 1.

TABLE 1

| | Random pattern | | |
|---|---|---|---|
| | PCA used for first layer | PCA used for second layer | PCA used for third layer |
| Area a | recorded | unrecorded | unrecorded |
| Area b | recorded | recorded | unrecorded |
| Area c | recorded | recorded | recorded |
| Area d | unrecorded | recorded | unrecorded |
| Area e | unrecorded | unrecorded | recorded |
| Area f | recorded | unrecorded | recorded |
| Area g | unrecorded | recorded | recorded |
| Area h | unrecorded | unrecorded | unrecorded |

By recording a random pattern into the PCAs of the first layer to the third layer in accordance with Table 1, all the combinations can be prepared with respect to the recorded/unrecorded states of the PCA used for the first layer to the PCA used for the third layer.

If OPC is carried out to the eight areas a to h of the PCA used for the fourth layer, then an optimum value of the recording power in all the combinations of the recorded/unrecorded states in the first layer to the third layer can be known, all the combinations occurring at the time of recording into the data recording area of the fourth layer of the optical disc, the optical disc allowing for a random recording. Then, recording of the fourth layer by the use of an average value of the optimum recording power in each combination facilitates execution of recording with an appropriate recording power with respect to the data recording area of the fourth layer.

Similarly, eight areas corresponding to a combination of the recorded/unrecorded states of the second layer to the fourth layer are prepared in the PCA of the first layer, and eight areas corresponding to a combination of the recorded/unrecorded states of the first layer, third layer, and fourth layer are prepared in the PCA of the second layer, and eight areas corresponding to a combination of the recorded/unrecorded states of the first layer, second layer, and fourth layer are prepared in the PCA of the third layer, and the recorded/unrecorded states are arranged appropriately in each area, and thereby with respect to any one of the first layer to the third layer, all the combinations of the recorded/unrecorded states of other layers can be prepared.

If the PCA is segmented into 32 areas ($4 \times 2^{4-1}$) in this manner, it is possible to provide an optical disc with all the combinations of the recorded/unrecorded states of other three layers, all the combinations possibly occurring at the time of recording into any recording layer of a recording type optical disc having four layers. In addition, if this is generalized, in the case of an optical disc having m layers it should be appreciated that $m \times 2^{m-1}$ areas just need to be prepared in advance.

In the foregoing, a combination of the recorded/unrecorded states of the lower recording layers away from the incident plane of a laser beam is also taken into consideration, so that the PCA is segmented into 32 areas. However, because an effect, which a cross talk from the lower recording layer has, at the time of recording into the upper recording layer is small, the PCA may be segmented taking into consideration only the recorded/unrecorded states of the upper recording layer. In other words, a total of 14 areas consisting of two areas used for the second layer taking into consideration the first layer, four areas used for the third layer taking into consideration the first layer to the second layer, and eight areas used for the fourth layer taking into consideration the first layer to the third layer may be prepared, thereby appropriately arranging the recorded/unrecorded states in each area.

If the PCA is segmented into 14 areas in this manner, it is possible to provide an optical disc with all the combinations of the recorded/unrecorded states of the upper layers, all the combinations possibly occurring at the time of recording into any recording layer of a recording type optical disc having four layers.

In addition, in the foregoing an optical disc having a four layer structure has been described as an example, but the application target of the present invention is not limited thereto, and the present invention can be applied also to an optical disc having any number of recording layers.

For example, when a total number of recording layers is m, if each PCA of the first layer to the (m−1)th layer is segmented into $2^{m-1}$ areas, then all the combinations of the recorded/unrecorded states from the upper first layer to the (m−1)th layer, all the combinations possibly occurring at the time of recording into the m-th layer, can be prepared. Moreover, if each PCA of the first layer to the (m−2)th layer is segmented into $2^{m-2}$ areas, then all the combinations of the recorded/unrecorded states from the upper first layer to the (m−2)th layer, all the combinations possibly occurring at the time of recording into the (m−1)th layer, can be prepared. Similarly, if the PCA of the first layer is segmented into $2^1$ areas, then all the combinations of the recorded/unrecorded states, all the combinations possibly occurring at the time of recording into the upper second layer, can be prepared.

Namely, when the number of recording layers is m, if the PCA of each layer is segments into ($2^{m-1}+2^{m-2}+\ldots+2^2+2^1$) areas, then all the combinations of the recorded/unrecorded states of the upper recording layers, all the combinations possibly occurring at the time of recording into any recording area, can be prepared in advance.

According to the first embodiment described above, it is possible to provide an optical disc including all the combinations of the recorded/unrecorded states in advance, all the combinations possibly being taken by the recording layers, through which the laser beam, when recording into any recording layer, passes until reaching this relevant recording layer. Then, if this optical disc is used, it is possible to easily carry out the recording power control described later, and also possible to provide a multi-layer optical disc suitable for calculating the recording power control that appropriately addresses a fluctuation in the optimum recording power caused by a variation in the transmissivity of the upper layer or a cross talk from the adjacent layer.

In addition, although in this embodiment an example has been shown, in which a random pattern is recorded in advance in a portion serving as a recorded area, a specific pattern may be recorded therein. With this configuration, a process to generate the random recording pattern can be omitted in manufacturing the optical disc.

Moreover, although in this embodiment an example has been shown, in which the PCA is located on the inner peripheral side of the data recording area, the PCA may be located on the outer peripheral side thereof or may exist on the both sides. With this configuration, the use of the PCA provided on the outer peripheral side allows a multi-layer optical disc capable of test writing at a recording rate different from that of the test writing on the inner peripheral side to be provided.

Moreover, in this embodiment an optical disc has been described, which stores all the combinations for the recorded/unrecorded states of the upper layers, however, an optical disc may be employed, which includes only a combination where all the PCAs of the upper layers are "recorded" and a combination where all the PCAs of the upper layers are "unrecorded". If this optical disc is employed, an optimum recording power in a situation where the transmissivity is highest and an optimum recording power in a situation where the transmissivity is lowest can be calculated easily, and an average value of the both can be also calculated easily.

Figure 2:
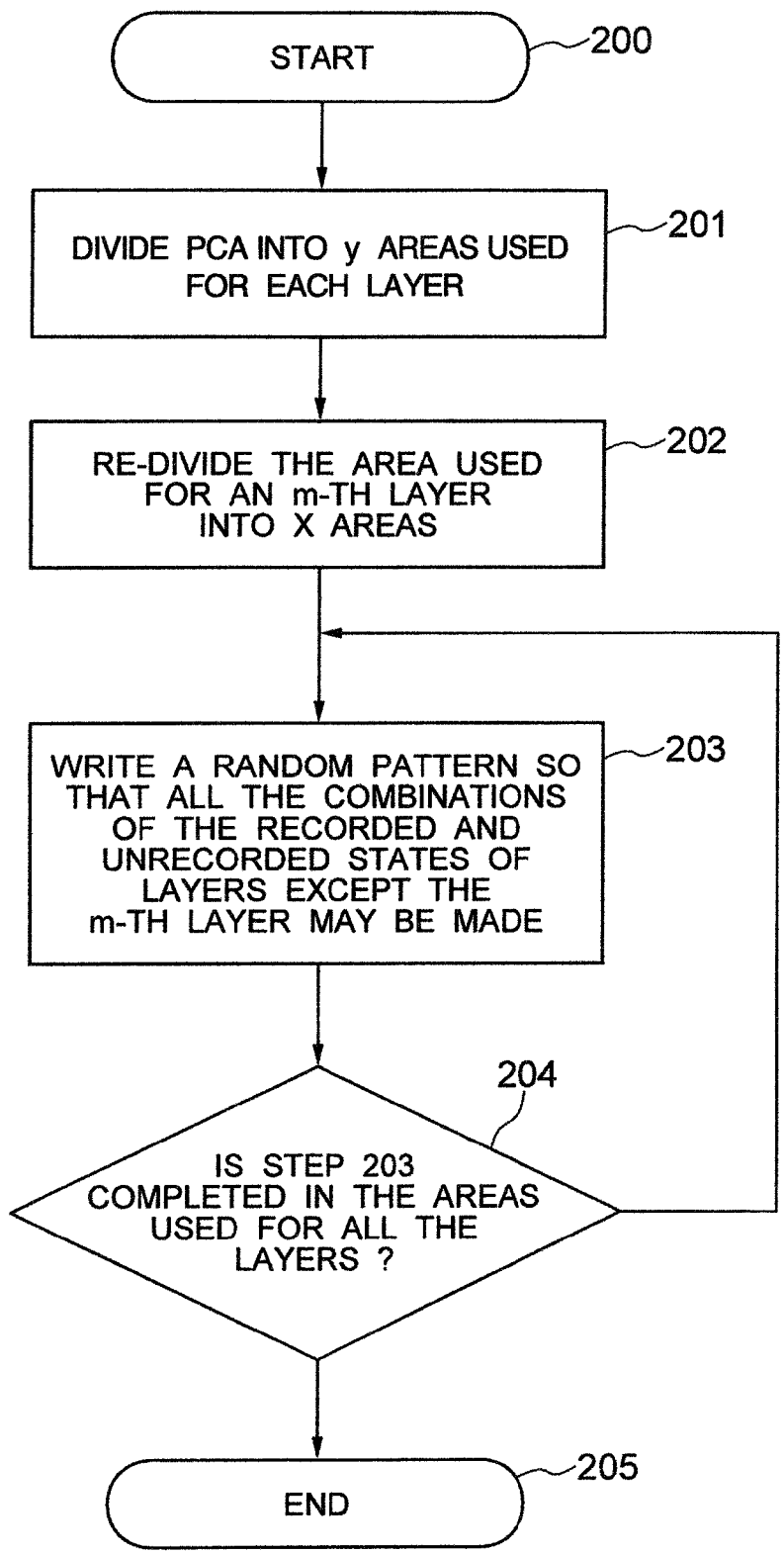
FIG. 2 is a view showing a second embodiment that is a method of manufacturing the multi-layer optical disc of the present invention.

FIG. 2 is a flowchart showing a second embodiment that is a method of manufacturing the multi-layer optical disc described as the first embodiment. This flowchart shows among the manufacturing steps a portion, in which PCAs are initialized for the purpose of OPC after the multi-layer optical disc is manufactured as a writable area in the ordinary manufacturing process.

Step 201 represents a step to divide the PCA into y areas used for each layer. In the case of the optical disc having a four layer structure shown in the first embodiment, y is four.

Step 202 represents a step to re-divide the y-divided PCA into X areas used for each layer (m-th layer). If all the combinations of recorded and unrecorded areas are provided in the optical disc having a four layer structure shown in the first embodiment, then X=8.

Step 203 represents a step, in which a random pattern is written to the each X-divided areas used for the m-th layer so that the combinations of the recorded and unrecorded states in each layer of each area may differ from each other. In the case of the optical disc having a four layer structure shown in the first embodiment, for example, this step corresponds to the step of sequentially writing a random pattern from the area a with respect to the areas a to h of the PCA used for the fourth layer.

Step 204 represents a step, in which it is determined whether the processing of Step 203 has been completed with respect to all the PCAs used for all the layers, and if not completed yet, Step 203 is carried out again, and if completed, the process of preparing PCA areas is terminated. In the case of the optical disc having a four layer structure shown in the first embodiment, it is determined whether all the combinations of recorded and unrecorded states in each layer have been prepared with respect to the PCA used for the fourth layer, PCA used for the third layer, PCA used for the second layer, and PCA used for the first layer.

According to this embodiment, even in the case where a difference in the transmissivity might occur or an effect or the like of a cross talk might occur depending on whether the other layer is recorded or unrecorded, execution of a random access, including the random access between layers, in a multi-layer disc allows for OPC corresponding to each case, so that even in a disc allowing for a random access, it is possible to manufacture a disc that can record with an appropriate recording power. Moreover, in this embodiment an example has been shown, in which for each area, writing of a random pattern is carried out selectively with respect to all the layers, however, for each layer, writing of a random pattern may be carried out selectively with respect to the areas, in this order. Moreover, it is possible to manufacture a disc that can record with an appropriate recording power using the method shown in this embodiment by recorder for the multi-layer optical disc.

Figure 3:
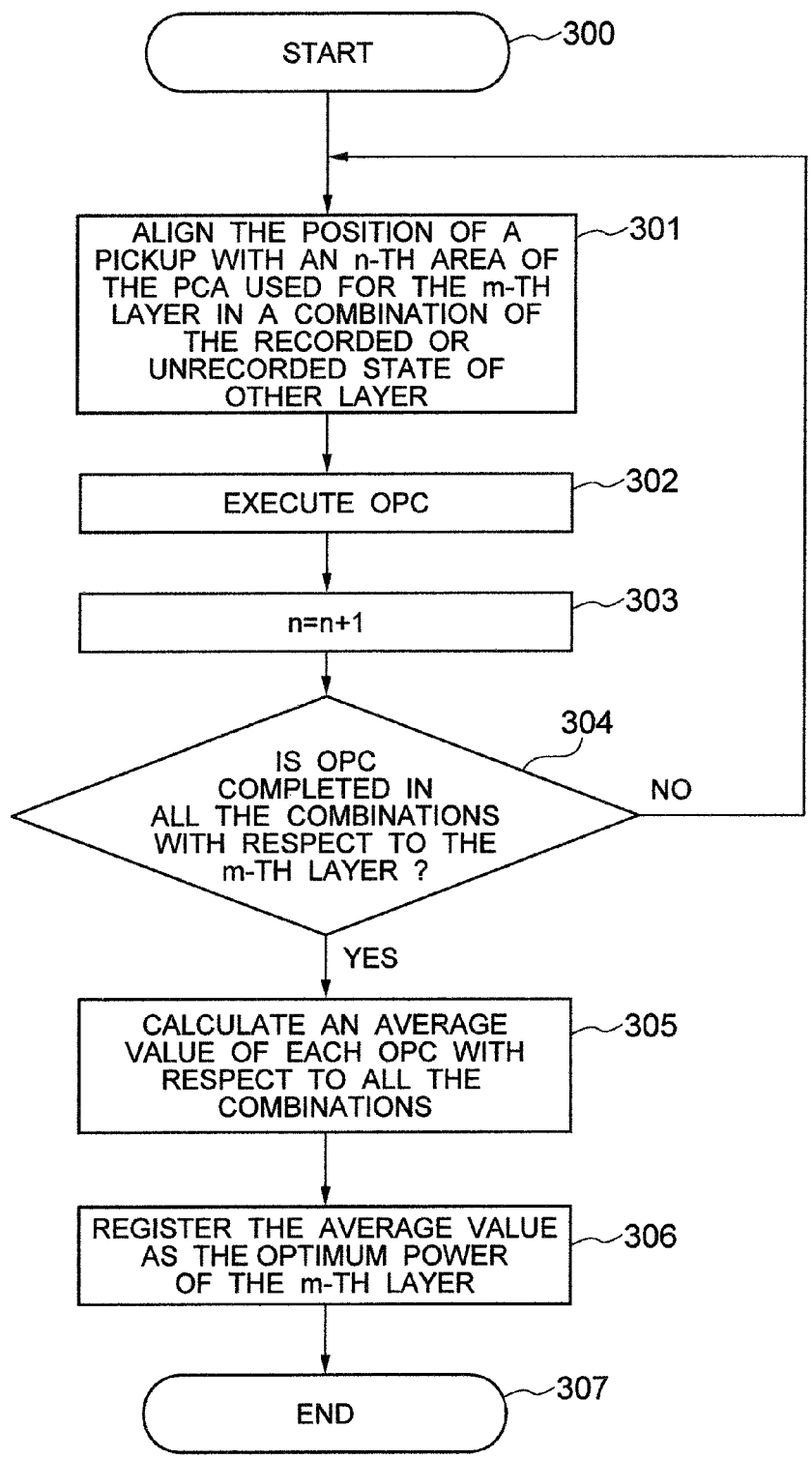
FIG. 3 is a view showing a third embodiment that is a recording method for the multi-layer optical disc of the present invention.

FIG. 3 is a flowchart showing a third embodiment that is a recording method for the multi-layer optical disc described as the first embodiment.

In Step 301, the position of a pickup is aligned with the n-th area of the PCA used for the m-th layer. In the case of the first embodiment, the position of the pickup is aligned with the area a, first.

In Step 302, OPC is executed. Specifically speaking, recording is carried out by changing the recording power successively and then an area where the recording was carried out is reproduced, and a recording power at which the reproduction quality becomes the best is selected as the optimum recording power. The judgment on the reproduction quality is made by using the error rate, jitter, waveform (e.g., $\beta$), or the like.

In Step 303, n=n+1 for the purpose of changing the area is carried out. Namely, in combination with Step 301, the area will be changed successively. Step 301 and Step 303 combined will change the position of the pickup from the area a, b, c, ... in this order, in the case of the first embodiment.

In Step 304, it is determined whether the OPC has been executed with respect to all the combinations used for the m-th layer, and if not completed yet, the flow will return to Step 301 to continue the flow, and if completed, the flow will proceed to the next step 305. In the case of the first embodiment, it will be determined whether the OPC has been done in all the areas a, b, c, d, e, f, g, and h.

In Step 305, an average value of the OPC results with respect to all the combinations of the recorded or unrecorded states of the other layers with respect to the m-th layer is calculated. In the first embodiment, an average value of the OPC results with respect to all the areas a, b, c, d, e, f, g, and h is calculated.

In Step 306, the average value calculated in Step 305 is registered as the optimum recording power of the m-th layer.

According to this embodiment, even if a random access, including the random access between the layers, is allowed in a multi-layer optical disc, the optimum recording power can be calculated. Specifically, by executing OPC in this manner, it is possible to calculate an appropriate laser power with respect to all the combinations possibly occurring at the time of recording into a desired recording layer, and also possible to carry out recording using the appropriate laser power calculated by OPC even when randomly recording into any recording layer.

In addition, in this embodiment the OPC of the m-th layer has been described, the same is true of other layer. Moreover, in this embodiment, with respect to the PCA used for the m-th layer, all the combinations of recorded/unrecorded states of the other layers are provided and then the OPC is carried out to all the combinations to calculate an average value, however, from a viewpoint of transmissivity, with respect to the PCA used for the m-th layer, all the combinations of the recorded and unrecorded states of the upper layers or a combination of areas selectively selected may be provided to carry out OPC and calculate an average value. Moreover, although in this embodiment an adjustment of the optimum power has been made with respect to each combination, an adjustment of the recording waveform may be further made. Moreover, although in this embodiment a configuration has been shown, in which an optimum recording power, which is an average value, is employed as the optimum recording power of the m-th layer, a central value of the optimum value dispersion may be used in place of using the average value.

Figure 4:
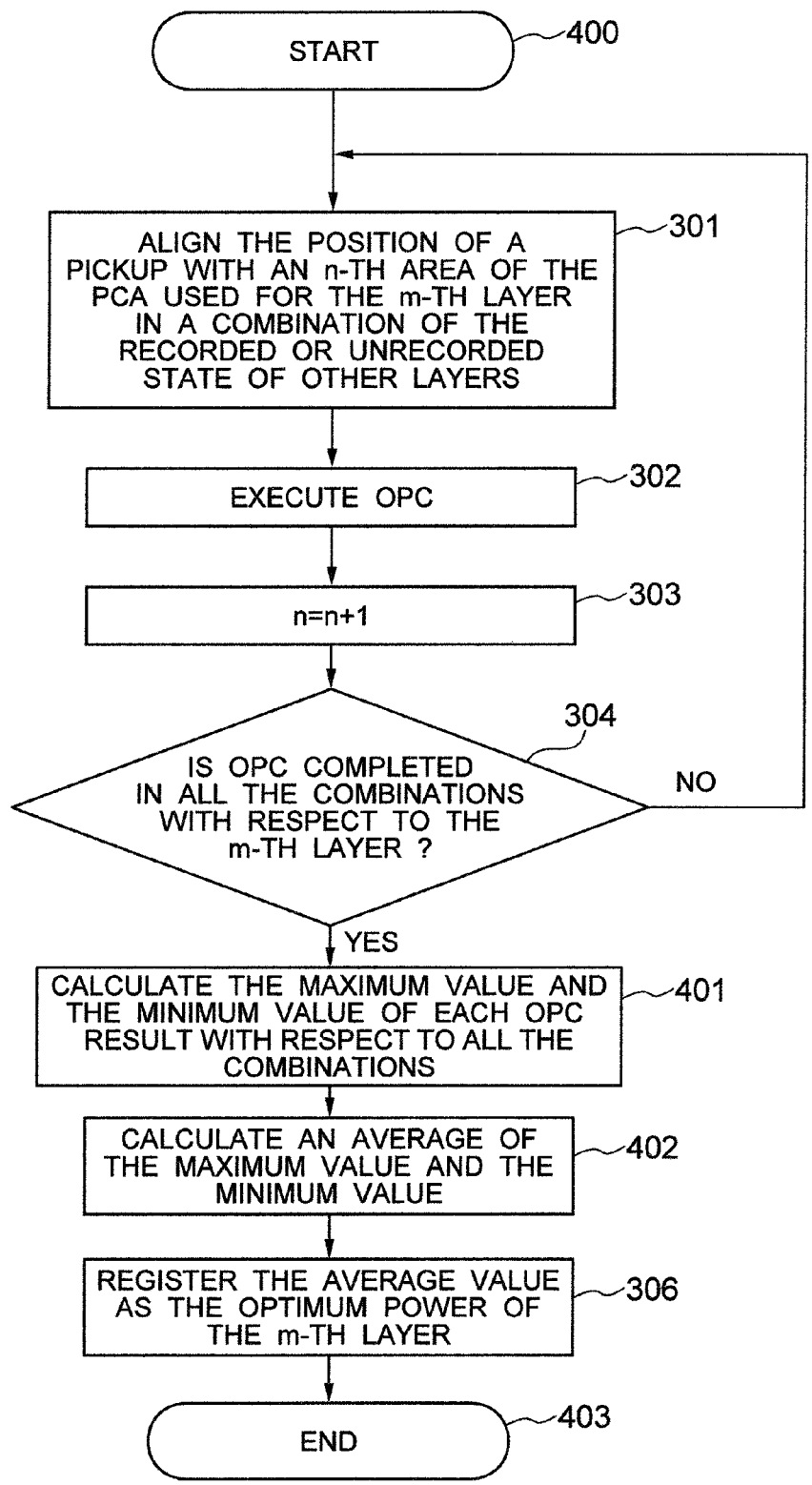
FIG. 4 is a view showing a fourth embodiment that is a recording method for the multi-layer optical disc of the present invention.

FIG. 4 is a flowchart showing a fourth embodiment that is a recording method for the multi-layer optical disc described as the first embodiment. In FIG. 4, Step 301, Step 302, Step 303, and Step 304 are similar to those of the third embodiment, so the descriptions thereof are omitted. In this embodiment, with respect to the PCA used for the m-th layer, all the combinations of the recorded and unrecorded states of the other layers are provided to carry out OPC to all the combinations. Hereinafter, the description is made in detail.

In Step 401, the maximum value and the minimum value of the results of the OPC with respect to all the combinations of the recorded or unrecorded state of the other layers with respect to the m-th layer are calculated.

In Step 402, an average of the maximum value and the minimum value is calculated.

In Step 306, as in the third embodiment, the calculated average value is registered as the optimum recording power of the m-th layer.

As described above, according to this embodiment, even if a random access, including the random access between the layers, is allowed in a multi-layer optical disc, the optimum recording power can be calculated. In addition, although in this embodiment the OPC of the m-th layer has been described, the same is true of other layer. Moreover, also in this embodiment, with respect to the PCA used for the m-th layer, all the combinations of the recorded and unrecorded states of the other layers are provided to carry out OPC, however, as in the third embodiment, with respect to the PCA used for the m-th layer, all the combinations of the recorded and unrecorded states of the upper layers or a combination of areas selectively selected may be provided to carry out OPC. Moreover, it is also possible to carry out OPC only to an area having the maximum value and an area having the minimum value among the combinations of the recorded and unrecorded states, taking into consideration the transmissivity. Moreover, although in this embodiment an adjustment of the optimum power has been made with respect to each combination, an adjustment of the recording waveform may be further made.

Figure 5:
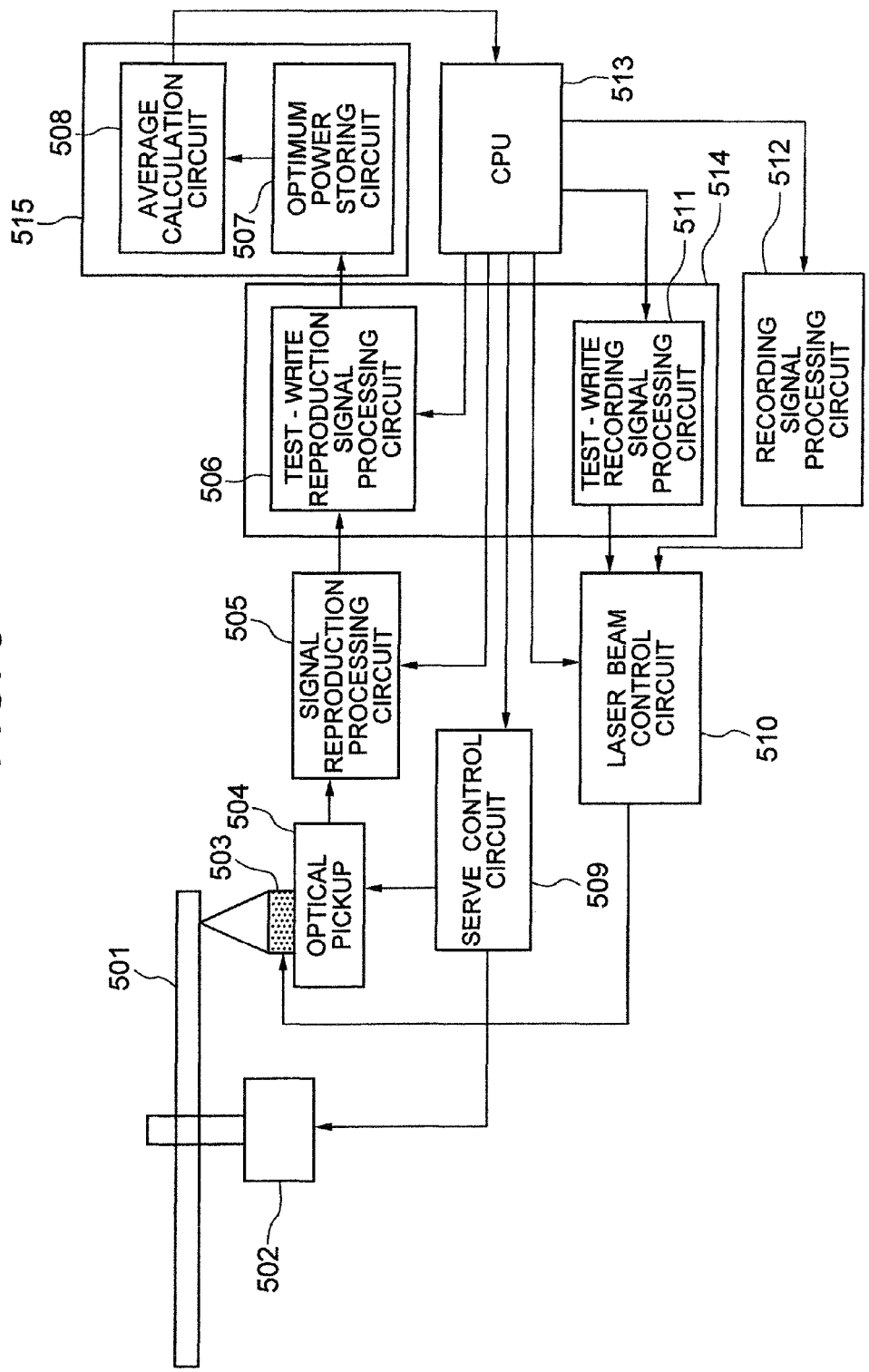
FIG. 5 is a view showing a fifth embodiment that is a recording apparatus for the multi-layer optical disc of the present invention.

FIG. 5 is a block diagram showing a fifth embodiment that is a recording apparatus for the multi-layer optical disc of the present invention.

In FIG. 5, reference numeral 501 represents an optical disc, reference numeral 502 represents a disc motor for rotating the optical disc 501, reference numeral 503 represents a laser that emits light for reading from and writing to the optical disc 501, reference numeral 504 represents an optical pickup having the laser 503 and further having a lens for focusing the laser beam on the optical disc, and an OEIC (optical electronic IC) for converting an optical signal into an electric signal, and reference numeral 505 represents a signal reproduction processing circuit, which carries out waveform equalization to a signal detected in the optical pickup 504, and reproduces a synchronous clock. The signal reproduction processing circuit further detects jitter at each edge.

Reference numeral 506 represents a test-write reproduction signal processing circuit, which carries out the processing shown in Step 302 of the third embodiment, i.e., the derivation of the optimum recording power for a defined area, on the basis of jitter detected in the signal reproduction processing circuit 505. Reference numeral 507 represents an optimum power storing circuit, which stores the optimum recording power for each area derived in the test-write reproduction signal processing circuit 506. Reference numeral 508 represents an average calculation circuit, which calculates an average of the optimum power for each area stored in the optimum power storing circuit 507 and sets this to the optimum recording power of a target layer. In addition, in this embodiment, the optimum recording power storing circuit 507 and the average calculation circuit 508 are provided inside an optimum recording power calculation circuit 515.

Reference numeral 509 represents a servo control circuit, which carries out the rotation control of the disc motor and the focusing and tracking control of the light beam. Reference numeral 510 represents a laser beam control circuit, which controls the light emission intensity of the laser 503. Reference numeral 511 represents a test-write recording signal processing circuit, which generates a signal pattern for trial writing to PCA. In this embodiment, the test-write recording signal processing circuit generates a random pattern, for example. In addition, in this embodiment, the test-write recording signal processing circuit 511 along with the test-write reproduction signal processing circuit 506 are provided inside a test write processing circuit 514. Reference numeral 512 represents a recording signal processing circuit, which executes the addition of an error correcting code and the modulation processing when writing a user data into a data recording area. Reference numeral 513 represents a CPU, which controls the signal reproduction processing circuit 505, the test-write reproduction signal processing circuit 506, the servo control circuit 509, the laser beam control circuit 510, the test-write recording signal processing circuit 511, and the recording signal processing circuit 512, and which also uses an output of the average calculation circuit 508 for controlling the laser beam control circuit 510.

Hereinafter, an operation when the recording apparatus of this embodiment records into the optical disc of the first embodiment using the recording method of the third embodiment is described.

First, corresponding to Step 301 of the third embodiment, the pickup is moved to the area a of the m-th layer under the control of the servo control circuit 509.

Next, corresponding to Step 302, two processings of writing and reading are carried out. First, in the writing process, the recording apparatus records a random pattern within this area, the random pattern being generated in the test-write recording signal processing circuit 511, while successively changing the light emission power of the laser 503 by means of the laser beam control circuit 510. In the reading process to be carried out next, the recorded signal is reproduced and detected in the optical pickup 503, and from this detected signal the jitter for each light emission power is detected in the signal reproduction processing circuit 505. The test-write reproduction signal processing circuit 506 calculate the light emission power minimizing the jitter to the optimum recording power, and stores this result in the optimum power storing circuit 507. A control to return from Step 303 to Step 301 via Step 304 is achieved by that the servo control circuit 509 successively moves the pickup to the area a, b, c, d, . . . of the first embodiment.

Corresponding to Step 304, when the CPU determined that the OPC in all the combinations has been completed, i.e., when the OPC in the areas a to h has been completed, the average calculation circuit 508 calculates an average of the results of the area a to the area h stored in the optimum power storing circuit 507, corresponding to Step 305.

Subsequently, corresponding to Step 306, the average value calculated in the average value calculation circuit 508 is sent to CPU 513 as the optimum recording power of the relevant m-th layer, and when recording a user data into the data recording area of the relevant m-th layer, the laser beam control circuit is controlled based on the optimum power sent to CPU 513.

As described above, according to this embodiment, it is possible to provide a recording apparatus that can calculate the optimum recording power in each layer with respect to a multi-layer recording optical disc that allows for a random access, including the random access between layers as well.

In addition, in this embodiment, a case has been described, in which the evaluation of the reproduction quality of a test-written signal is made using jitter, however, when the evaluation is made using waveform information, such as $\beta$, the detection of $\beta$ is made in the signal reproduction processing circuit 505, and the light emission power providing a target $\beta$ value is set to the optimum recording power in the test-write reproduction signal processing circuit 506. Moreover, although in this embodiment an adjustment of the optimum power is made, an adjustment of the recording waveform may be further made. In this case, the recording waveform is controlled by the laser beam control circuit 509.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A multi-layer optical disc having m (m is an integer equal to or larger than 3) recording layers, which is arranged in a manner that at least $1^{st}$ to k-th small areas (k is an integer of $2^{b-1}$) are provided as to a b-th recording layer (b is an integer from 2 to m) to thereby provide n ($n \geq 2^{m-1}+2^{m-2}+\ldots+2^2+2^1$) small areas in total as to $2^{nd}$ to m-th recording layers, and recording is performed in a manner that with respect to the $1^{st}$ to k-th unrecorded small areas of the b-th recording layer, a combination of recorded/unrecorded states of data in (b−1) small areas at a radius position of a (b−1)-th recording layer nearer to an incident plane of a laser beam than the b-th recording layer differs from a combination of recorded/unrecorded states of data in (b−1) small areas at another radius position of the (b−1)-th recording layer.

2. A multi-layer optical disc according to claim 1, wherein the multi-layer optical disc is recorded in a manner that, after the recording in the manner that the combination of recorded/unrecorded states of data in (b-1) small areas at the radius position of the (b-1)-th recording layer differs from the combination of recorded/unrecorded states of data in (b-1) small areas at the another radius position of the (b-1)-th recording layer, recording the $2^{b-1}$ small areas of the b-th recording layer with a plurality of recording powers at the time of the recording when recording in the manner that the combination of recorded/unrecorded states of data in (b-1) small areas at the radius position of the (b-1)-th recording layer differs from the combination of recorded/unrecorded states of data in (b-1) small areas at the another radius position of the (b-1)-th recording layer; and recording quality of data of a predetermined layer recorded with the plurality of recording powers is evaluated.

3. A recording method for a multi-layer optical disc having m (m is an integer equal to or larger than 3) recording layers, the method comprising:

providing at least $1^{st}$ to k-th small areas (k is an integer of $2^{b-1}$) as to a b-th recording layer (b is an integer from 2 to m) to thereby provide n ($n \geq 2^{m-1}+2^{m-2}+\ldots+2^2+2^1$) small areas in total as to $2^{nd}$ to m-th recording layers, and recording in a manner that with respect to the $1^{st}$ to k-th unrecorded small areas of the b-th recording layer, a combination of recorded/unrecorded states of data in (b-1) small areas at a radius position of a (b-1)-th recording layer nearer to an incident plane of a laser beam than the b-th recording layer differs from a combination of recorded/unrecorded states of data in (b-1) small areas at another radius position of the (b-1)-th recording layer;

after the recording in the manner that the combination of recorded/unrecorded states of data in (b-1) small areas at the radius position of the (b-1)-th recording layer differs from the combination of recorded/unrecorded states of data in (b-1) small areas at the another radius position of the (b-1)-th recording layer, recording the $2^{b-1}$ small areas of the b-th recording layer with a plurality of recording powers at the time of the recording when recording in the manner that the combination of recorded/unrecorded states of data in (b-1) small areas at the radius position of the (b-1)-th recording layer differs from the combination of recorded/unrecorded states of data in (b-1) small areas at the another radius position of the (b-1)-th recording layer; and evaluating recording quality of data of a predetermined layer recorded with the plurality of recording powers.

4. A recording method for a multi-layer optical disc having m (m is an integer equal to or larger than 3) recording layers, the method comprising:

with respect to the multi-layer optical disc which is arranged in a manner that at least $1^{st}$ to k-th small areas (k is an integer of $2^{b-1}$) are provided as to a b-th recording layer (b is an integer from 2 to m) to thereby provide n ($n \geq 2^{m-1}+2^{m-2}+\ldots+2^2+2^1$) small areas in total as to $2^{nd}$ to m-th recording layers, and recording is performed in a manner that with respect to the $1^{st}$ to k-th unrecorded small areas of the b-th recording layer, a combination of recorded/unrecorded states of data in (b-1) small areas at a radius position of a (b-1)-th recording layer nearer to an incident plane of a laser beam than the b-th recording layer differs from a combination of recorded/unrecorded states of data in (b-1) small areas at another radius position of the (b-1)-th recording layer, recording the $2^{b-1}$ small areas of the b-th recording layer with a plurality of recording powers; and evaluating recording quality of data of a predetermined layer recorded with the plurality of recording powers.

5. A recording apparatus for a multi-layer optical disc having m (m is an integer equal to or larger than 3) recording layers, comprising:

a laser which irradiates the optical disc with a laser beam;

a laser beam control circuit which controls the laser;

a unit which, in a case of providing at least $1^{st}$ to k-th small areas (k is an integer of $2^{b-1}$) as to a b-th recording layer (b is an integer from 2 to m) to thereby provide n ($n \geq 2^{m-1}+2^{m-2}+\ldots+2^2+2^1$) small areas in total as to $2^{nd}$ to m-th recording layers, records in a manner that with respect to the $1^{st}$ to k-th unrecorded small areas of the b-th recording layer, a combination of recorded/unrecorded states of data in (b-1) small areas at a radius position of a (b-1)-th recording layer nearer to an incident plane of a laser beam than the b-th recording layer differs from a combination of recorded/unrecorded states of data in (b-1) small areas at another radius position of the (b-1)-th recording layer;

a unit which, after the recording in the manner that the combination of recorded/unrecorded states of data in (b-1) small areas at the radius position of the (b-1)-th recording layer differs from the combination of recorded/unrecorded states of data in (b-1) small areas at the another radius position of the (b-1)-th recording layer, records the $2^{b-1}$ small areas of the b-th recording layer with a plurality of laser powers at the time of the recording when recording in the manner that the combination of recorded/unrecorded states of data in (b-1) small areas at the radius position of the (b-1)-th recording layer differs from the combination of recorded/unrecorded states of data in (b-1) small areas at the another radius position of the (b-1)-th recording layer; and a unit which evaluates recording quality of data of a predetermined layer recorded with the plurality of laser powers.

6. A recording apparatus for a multi-layer optical disc having m (m is an integer equal to or larger than 3) recording layers, comprising:

a laser which irradiates a laser beam with respect to the multi-layer optical disc which is arranged in a manner that at least $1^{st}$ to k-th small areas (k is an integer of $2^{b}$)

are provided as to a b-th recording layer (b is an integer from 2 to m) to thereby provide n ($n \geq 2^{m-1}+2^{m-2}+\ldots+2^2+2^1$) small areas in total as to $2^{nd}$ to m-th recording layers, and recording is performed in a manner that with respect to the $1^{st}$ to k-th unrecorded small areas of the b-th recording layer, a combination of recorded/unrecorded states of data in (b-1) small areas at a radius position of a (b-1)-th recording layer nearer to an incident plane of a laser beam than the b-th recording layer differs from a combination of recorded/unrecorded states of data in (b-1) small areas at another radius position of the (b-1)-th recording layer;

a laser beam control circuit which controls the laser;

a unit which records the $2^{b-1}$ small areas of the b-th recording layer with a plurality of recording powers; and a unit which evaluates recording quality of data of a predetermined layer recorded with the plurality of recording powers.

* * * * *